United States Patent [19]

Takamura et al.

[11] Patent Number: 4,716,512

[45] Date of Patent: Dec. 29, 1987

[54] MULTIPLE STEP-UP RECTIFIER CIRCUIT

[75] Inventors: Yoshio Takamura; Akira Nakajima, both of Yokohama, Japan

[73] Assignee: Kabushiki Kaisha Toshiba, Kawasaki, Japan

[21] Appl. No.: 903,425

[22] Filed: Sep. 4, 1986

[30] Foreign Application Priority Data

Sep. 10, 1985 [JP] Japan .................. 60-198507

[51] Int. Cl.$^4$ ........................................ H02M 7/25
[52] U.S. Cl. ........................................ 363/61
[58] Field of Search ........................ 363/59, 60, 61

[56] References Cited

U.S. PATENT DOCUMENTS 2,619,602  11/1986  Walker et al. ................ 307/110

FOREIGN PATENT DOCUMENTS 58-23301   8/1984  Japan .
58-69366  11/1984  Japan .
58182696   2/1985  Japan .

OTHER PUBLICATIONS

Handbook of Rectifier Circuits published by Ellis Horwood Co. Ltd. 1980, pp. 158–168.

Primary Examiner—Peter S. Wong
Assistant Examiner—Judson H. Jones
Attorney, Agent, or Firm—Oblon, Fisher, Spivak, McClelland, & Maier

[57] ABSTRACT

A multiple step-up rectifier circuit, according to the invention, has a plurality of multiple step-up rectifier circuits, each of which is constituted by a combination of a plurality of diodes connected in series, output capacitors which are connected in parallel with this series circuit of the diodes, and supply capacitors which are charged by the input AC voltages and which supply the voltages to the output capacitors in amounts equal to the discharged voltages thereof. These plurality of multiple step-up rectifier circuits are connected in series, and each of these circuits receives an arbitrary AC voltage and generates a multiple step-up voltage. In these two adjacent circuits, there is the following relation:

$$\frac{C_1}{C_2} = \frac{\tfrac{3}{4}n_1^2 + n_1 + \tfrac{3}{8}}{\tfrac{3}{4}n_2^2 + n_2 + \tfrac{3}{8}} \times \frac{I_1}{I_2} \times \frac{E_2}{E_1}$$

where, $C_1$ is the capacitance of each of the capacitors constituting one of the multiple step-up rectifier circuits; $E_1$ is the input voltage thereof; $I_1$ is the value which is obtained by adding the output current of this circuit and all of the output currents of the circuits of the post stage of this circuit; $n_1$ is the half of the number of supply capacitors of this circuit; $C_2$ is the capacitance of each of the capacitors constituting the other multiple step-up rectifier circuits; $E_2$ is the input voltage thereof; $I_2$ is the value which is derived by adding the output current of the second circuit and all of the output currents of the circuits at the post stage of this circuit; and $n_2$ is the half of the number of the supply capacitors of the second circuit.

9 Claims, 3 Drawing Figures

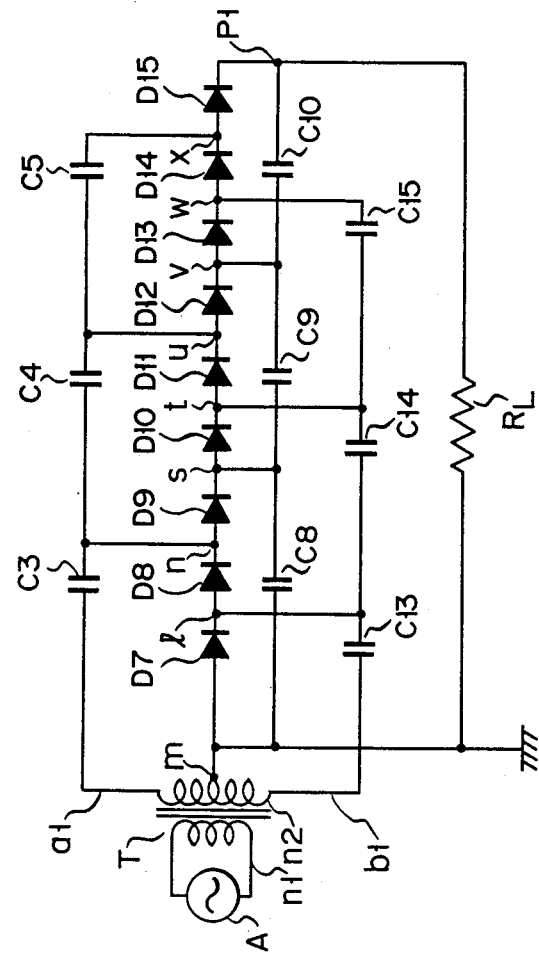
F I G. 2

MULTIPLE STEP-UP RECTIFIER CIRCUIT

BACKGROUND OF THE INVENTION

The present invention relates to a multiple step-up rectifier circuit which is constituted by a combination of a plurality of capacitors and diodes and, more particularly, to a multiple step-up rectifier circuit having a plurality of output terminals in which different voltages and currents can be output from these output terminals, respectively.

In general, the multiple step-up rectifier circuit constituted by a combination of a plurality of capacitors and diodes has a high internal impedance; therefore, it has a drawback such that the output voltage changes significantly in response to a variation in load. In the case of taking out a voltage from the center tap of the rectifier circuit, other output voltages will be significantly influenced. Consequently, it is difficult to keep the ratios among the output voltages constant irrespective of the load condition. Therefore, in the conventional multiple step-up rectifier circuit, in the case of outputting a plurality of different voltages, it is very difficult to simultaneously regulate the output voltages. In addition, since each output voltage depends on the number of multiple steps, the voltage values can hardly be arbitrarily determined.

SUMMARY OF THE INVENTION

It is an object of the present invention to provide a multiple step-up rectifier circuit in which a plurality of output voltages can be arbitrarily set, the output voltage ratios can be maintained at constant values irrespective of the load condition, and each output voltage can be regulated.

According to an aspect of the present invention, there is provided a multiple step-up rectifier circuit comprising:

a plurality of rectifying elements which are connected in series so that the rectifying directions are the same and in each of which one end is connected to a reference potential point;

a plurality of first capacitors which are connected in series between both ends of the plurality of rectifying elements connected in series and which are connected in parallel with the plurality of rectifying elements;

a plurality of output terminals, each for taking out a voltage across an arbitrary number of first capacitors among the plurality of first capacitors;

a plurality of second capacitors, each end of which is connected to every other node among a plurality of mutual nodes of the plurality of rectifying elements connected with each other between the reference potential point and each of the output terminals;

a plurality of third capacitors, each end of which is connected to the nodes to which the second capacitors are not connected among the mutual nodes of the plurality of rectifying elements connected with each other between the reference potential point and each of the output terminals, each of the third capacitors having the same capacitance as that of each of the second capacitors; and a plurality of pairs of input terminals which are provided for every circuit which is constituted between the reference potential point and each of the output terminals, the second capacitors of the circuit being connected in series with one of the pair of input terminals and the third capacitors being connected in series with the other pair of input terminals, and the plurality of pairs of input terminals being supplied with arbitrary AC voltages for a reference potential, respectively, wherein the relation of the following expression is presented between the adjacent two circuits among the respective circuits which are constituted between the reference potential point and each of the output terminals, $$\frac{C_1}{C_2} = \frac{\frac{1}{2}n_1^2 + n_1 + \frac{1}{2}}{\frac{1}{2}n_2^2 + n_2 + \frac{1}{2}} \times \frac{I_1}{I_2} \times \frac{E_2}{E_1}$$

where, $C_1$: capacitance value of each of the second and third capacitors constituting one of the two adjacent circuits, $C_2$: capacitance value of each of the second and third capacitors constituting the other circuit, $n_1$: half of the number of the second and third capacitors constituting one of the circuits, $n_2$: half of the number of the second and third capacitors constituting the other circuit, $I_1$: current value which is obtained by adding all of the output currents of the circuits at the post stage of one of the circuits to the output current of one of the circuits, $I_2$: current value which is obtained by adding all of the output currents of the circuits at the post stage of the other circuit to the output current of the other circuit, $E_1$: value of the AC voltage which is supplied to one of the circuits, $E_2$: value of the AC voltage which is supplied to the other circuit.

BRIEF DESCRIPTION OF THE DRAWINGS

FIG. 2 is a reference circuit arrangement diagram for explaining the invention.

DETAILED DESCRIPTION OF PREFERRED EMBODIMENTS

An embodiment of the present invention will now be described in detail hereinbelow with reference to the drawings.

Figure 1:
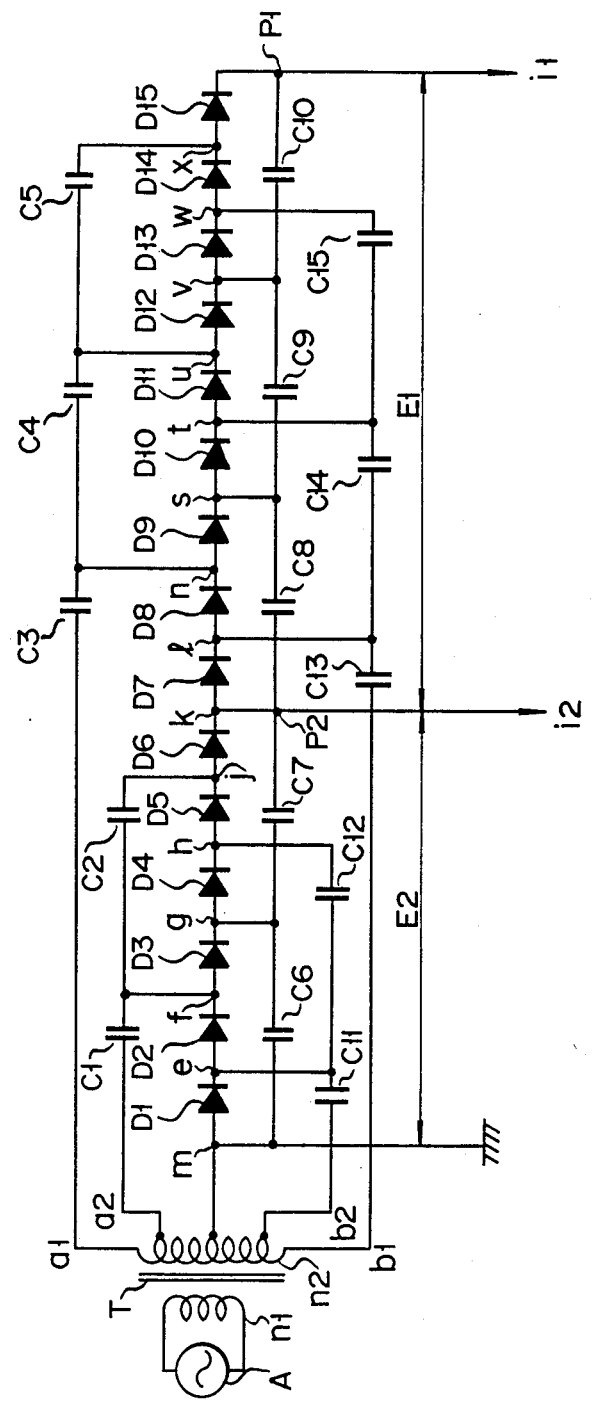
FIG. 1 is a circuit arrangement diagram showing the first embodiment of a multiple step-up rectifier circuit according to the present invention.

FIG. 1 shows an arrangement of the first embodiment. In the diagram, reference character A denotes an AC power source in which a voltage to be generated can be arbitrarily adjusted. AC power source A is connected to a primary winding $n_1$ of a transformer T. A secondary winding $n_2$ of transformer T has a center tap terminal m. Tap terminals $a_2$ and $b_2$ are provided among center tap terminal m and respective terminals $a_1$ and $b_1$ at both ends of secondary winding $n_2$, respectively. In this multiple step-up rectifier circuit, terminals $a_1$ and $b_1$ are used as the first input terminals and tap terminals $a_2$ and $b_2$ are used as the second input terminals, and center tap terminal m is connected to the ground and used as the reference potential terminal. Diodes $D_1$ to $D_{15}$ are connected in series between reference potential terminal m and first output terminal $P_1$ so that the rectifying directions are the same. The anode of diode $D_1$ is connected to terminal m and the cathode of diode $D_{15}$ is connected to output terminal $P_1$.

It is now assumed that the respective nodes among diodes $D_1$ to $D_{15}$ are e, f, g, h, j, k, l, n, s, t, u, v, w, and x. A capacitor $C_1$ is connected between $a_2$ and f. A capacitor $C_2$ is connected between f and j. A capacitor $C_3$ is connected between $a_1$ and n. A capacitor $C_4$ is connected between n and u. A capacitor $C_5$ is connected between u and x. A capacitor $C_6$ is connected between m and g. A capacitor $C_7$ is connected between g and k. A capacitor $C_8$ is connected between k and s. A capacitor $C_9$ is connected between s and v. A capacitor $C_{10}$ is connected between v and $P_1$. A capacitor $C_{11}$ is connected between $b_2$ and e. A capacitor $C_{12}$ is connected between e and h. A capacitor $C_{13}$ is connected between $b_1$ and l. A capacitor $C_{14}$ is connected between l and t. A capacitor $C_{15}$ is connected between t and w.

Capacitors $C_1$ and $C_2$; $C_3$ to $C_5$; $C_6$ to $C_{10}$; $C_{11}$ and $C_{12}$; and $C_{13}$ to $C_{15}$ are connected in series, respectively. Node k is a second output terminal $P_2$. Namely, capacitors $C_6$ and $C_7$ are the output capacitors between second output terminal $P_2$ and reference potential terminal m. Capacitors $C_8$ to $C_{10}$ are output capacitors between first and second output terminals $P_1$ and $P_2$. The other capacitors, $C_1$ to $C_5$ and $C_{11}$ to $C_{15}$, are supply capacitors to supply charging currents to output capacitors $C_6$ to $C_{10}$, respectively. As mentioned above, according to this multiple step-up rectifier circuit, the first multiple step-up rectifier circuit is constituted between first and second output terminals $P_1$ and $P_2$, the second multiple step-up rectifier circuit is constituted between second output terminal $P_2$ and reference potential terminal m, and second output terminal $P_1$ is used as the reference potential terminal of the first multiple step-up rectifier circuit.

The respective capacitances of capacitors $C_3$ to $C_5$, $C_8$ to $C_{10}$, and $C_{13}$ to $C_{15}$ constituting the first rectifier circuit are all equal and assume $C_a$ [F]. On the other hand, the respective capacitances of capacitors $C_1$, $C_2$, $C_6$, $C_7$, $C_{11}$, and $C_{12}$ constituting the second rectifier circuit are all equal and assume $C_b$ [F]. It is also assumed that AC power source A generates the AC voltage of a frequency $f$ ($=1/T$: T is a period) [Hz].

In the above constitution, the operations in the loadless condition and in the condition in which a load is connected will now be described herein below.

In the loadless condition, it is now assumed that when the AC voltage of frequency f [Hz] was supplied to primary winding $n_1$ of transformer T from AC power source A, the AC voltage of $2E_{01}$ [V] is generated between terminals $a_1$ and $b_1$ of secondary winding $n_2$ and the AC voltage of $2E_{02}$ [V] is generated between terminals $a_2$ and $b_2$, respectively. It is now assumed that the potential of terminal $b_2$ becomes $-E_{02}$. At this time, diode $D_1$ is made conductive and a current flows from reference potential terminal m to terminal $b_2$ through diode $D_1$, node e, and capacitor $C_{11}$ (hereinafter, this current flow is expressed by m→$D_1$→e→$C_{11}$→$b_2$). Thus, the voltage of $E_{02}$ is charged into capacitor $C_{11}$ in which polarity on the node e side is positive.

Next, when the potential of terminal $a_2$ becomes $-E_{02}$, diode $D_2$ is made conductive and a current flows in accordance with the order of $b_2$→$C_{11}$→e→$D_2$→f→$C_1$→$a_2$. Thus, the voltage of $3E_{02}$, which is the sum of the voltage $2E_{02}$ between $a_2$ and $b_2$ and the charging voltage $E_{02}$ of capacitor $C_1$, is charged into capacitor $C_1$ in which the polarity on the node f side is positive.

Subsequently, when the potential of terminal $b_2$ becomes $-E_{02}$, diode $D_3$ is made conductive and a current flows in accordance with the order of $a_2$→$C_1$→f→$D_3$→g→$C_6$→m. Thus, the voltage of $4E_{02}$, which is the sum of the voltage $E_{02}$ between $a_2$ and m and the charging voltage $3E_{02}$ of capacitor $C_1$, is charged into capacitor $C_6$ in which the polarity on the node g side is positive. At this time, since the potential of terminal $a_2$ is $+E_{02}$, diode $D_4$ is made conductive and a current flows in accordance with the order of $a_2$→$C_1$→f→$D_3$→g→$D_4$→h→$C_{12}$→$C_{11}$→$b_2$→m. Thus, the voltage of $4E_{02}$, which is the sum of the voltage $2E_{02}$ between $a_2$ and $b_2$ and the charging voltage $3E_{02}$ of capacitor $C_1$ and the charging voltage $-E_{02}$ of capacitor $C_{11}$, is charged into capacitor $C_{12}$ in which the polarity on the node h side is positive.

Next, when the potential of terminal $b_2$ becomes $+E_{02}$, diode $D_5$ is made conductive and a current flows in accordance with the order of $b_2$→$C_{11}$→$C_{12}$→h→$D_5C_2$→$C_1$→$a_2$. Thus, the voltage of $4E_{02}$, which is the sum of the voltage $2E_{02}$ between $a_2$ and $b_2$, the charging voltage $E_{02}$ of capacitor $C_1$, the charging voltage $4E_{02}$ of capacitor $C_{12}$, and the charging voltage $-3E_{02}$ of capacitor $C_1$, is charged into capacitor $C_2$ in which the polarity on the node j side is positive. When the potential of terminal $a_2$ then becomes $+E_{02}$, diode $D_6$ is made conductive and a current flows in accordance with the order of $a_2$→$C_1$→$C_2$→j→$D_6$→k ($P_2$)→$C_7$→$C_6$→m. Thus, the voltage of $4E_{02}$, which is the sum of the voltage $E_{02}$ between $a_2$ and m, the charging voltage $3E_{02}$ of capacitor $C_1$, the charging voltage $4E_{02}$ of capacitor $C_6$, and the charging voltage $-4E_{02}$ of capacitor $C_6$, is charged into capacitor $C_7$ in which the polarity on the node k side is positive.

At this time, since the potential of terminal $b_1$ is $-E_{01}$, diode $D_7$ is made conductive, and a current flows in accordance with the order of $a_2$→$C_1$→$C_2$→j→$D_6$→k→$D_7$→l→$C_{13}$→$b_1$. Thus, the voltage of $8E_{02}+E_{01}$, which is the sum of the voltage $E_{02}$ between $a_2$ and m, the charging voltage $3E_{02}$ of capacitor $C_1$, the charging voltage $4E_{02}$ of capacitor $C_2$, and the voltage $E_{01}$ between m and $b_1$, is charged into capacitor $C_{13}$ in which the polarity on the node l side is positive.

Next, when the potential of terminal $b_1$ becomes $-E_{01}$, diode $D_8$ is made conductive and a current flows in accordance with the order of $b_2$→$C_{13}$→l→$D_8$→n→$C_3$→$a_1$. Thus, the voltage of $8E_{02}+3E_{01}$, which is the sum of the voltage $2E_{01}$ between $a_1$ and $b_1$ and the charging voltage $8E_{02}+E_{01}$ of capacitor $C_{13}$, is charged into capacitor $C_3$ in which the polarity on the node n side is positive.

Then, when the potential of terminal $a_1$ becomes $+E_{01}$, diode $D_9$ is made conductive, and a current flows in accordance with the order of $a_1$→$C_3$→n→$D_9$→s $C_8$→$C_7$→$C_5$→m. Thus, the voltage of $4E_{01}$, which is the sum of the voltage $E_{01}$ between $a_1$ and m, the charging voltage $8E_{02}+3E_{01}$ of capacitor $C_3$, and charging voltages $-4E_{02}$ and $-4E_{02}$ of capacitors $C_7$ and $C_6$, is charged into capacitor $C_8$ in which the polarity on the node s side is positive. At this time, since the potential of terminal $b_1$ is $-E_{01}$, diode $D_{10}$ is made conductive, and a current flows in accordance with the order of $a_1$→$C_3$→n→$D_9$→s→$D_{10}$→t→$C_{14}$→$C_{13}$→$b_1$. Thus, the voltage of $4E_{01}$, which is the sum of the voltage $2E_{01}$ between $a_1$ and $b_2$, the charging voltage $8E_{02}+3E_{01}$ of capacitor $C_3$, and the charging voltage $-(8E_{02}+E_{01})$ of capacitor $C_{13}$, is charged into capacitor $C_{14}$ in which the polarity on the node t side is positive.

Subsequently, when the potential of terminal $b_1$ becomes $+E_{01}$, diode $D_{11}$ is made conductive, and a current flows in accordance with the order of $b_1 \rightarrow C_{13} \rightarrow C_{14} \rightarrow t \rightarrow D_{11} \rightarrow u \rightarrow C_4 \rightarrow C_3 \rightarrow a_1$. Thus, the voltage of $4E_{01}$, which is the sum of the voltage $2E_{01}$ between $a_1$ and $b_1$, the charging voltages $8E_{02}+E_{01}$ and $4E_{01}$ of capacitors $C_{13}$ and $C_{14}$, and the charging voltage $-(8E_{02}3E_{01})$ of capacitor $C_3$, is charged into capacitor $C_4$ in which the polarity on the node u side is positive.

Next, when the potential of terminal $a_1$ becomes $+E_{01}$, diode $D_{12}$ is made conductive, and a current flows in accordance with the order of $a_1 \rightarrow C_3 \rightarrow C_4 \rightarrow u \rightarrow D_{12} \rightarrow v \rightarrow C_9 \rightarrow C_8 \rightarrow C_7 \rightarrow C_6 \rightarrow m$. Thus, the voltage of $4E_{01}$, which is the sum of the voltage $E_{01}$ between $a_1$ and m, the charging voltages $8E_{02}+3E_{01}$ and $4E_{01}$ of capacitors $C_3$ and $C_4$, and the charging voltages $-4E_{01}$, $-4E_{02}$, and $-4E_{02}$ of capacitors $C_8$, $C_7$, and $C_6$, is charged into capacitor $C_9$, in which the polarity on the node v side is positive. At this time, since the potential of terminal $b_1$ is $-E_{01}$, diode $D_{13}$ is made conductive, and a current flows in accordance with the order of $a_1 \rightarrow C_3 \rightarrow C_4 \rightarrow u \rightarrow D_{12} \rightarrow v \rightarrow D_{13} \rightarrow w \rightarrow C_{15} \rightarrow C_{14} \rightarrow C_{13} \rightarrow b_1$. Thus, the voltage of $2E_{01}$, which is the sum of the voltage $2E_{01}$ between $a_1$ and $b_1$, the charging voltages $8E_{02}+3E_{01}$ and $4E_{01}$ of capacitors $C_3$ and $C_4$, and the charging voltages $-4E_{01}$ and $-(4E_{02}+E_{01})$ of capacitors $C_{14}$ and $C_{13}$, is charged into capacitor $C_{15}$, in which the polarity on the node w side is positive.

Next, when the potential of terminal $b_1$ becomes $+E_{01}$, diode $D_{14}$ is made conductive, and a current flows in accordance with the order of $b_1 \rightarrow C_{13} \rightarrow C_{14} \rightarrow C_{15} \rightarrow w \rightarrow D_{14} \rightarrow x \rightarrow C_5 \rightarrow C_4 \rightarrow C_3 \rightarrow a_1$. Thus, the voltage of $4E_{01}$, which is the sum of the voltage $2E_{01}$ between $a_1$ and $b_1$, the charging voltages $8E_{02}+E_{01}$, $4E_{01}$, and $4E_{01}$ of capacitors $C_{13}$, $C_{14}$, and $C_{15}$, and the charging voltages $-4E_{01}$ and $-(8E_{02}+3E_{01})$ of capacitors $C_4$ and $C_3$, is charged into capacitor $C_5$, in which the polarity on the node x side is positive.

Next, when the potential of terminal $a_1$ becomes $+E_{01}$, diode $D_{15}$ is made conductive and a current flows in accordance with the order of $a_1 \rightarrow C_3 \rightarrow C_4 \rightarrow C_5 \rightarrow x \rightarrow D_{15} \rightarrow P_1 \rightarrow C_{10} \rightarrow C_9 \rightarrow C_8 \rightarrow C_7 \rightarrow C_6 \rightarrow m$. Thus, the voltage of $4E_{01}$, which is the sum of the voltage $2E_{01}$ between $a_1$ and $b_1$, the charging voltages $8E_{02}+3E_{01}$, $4E_{01}$, and $4E_{01}$ of capacitors $C_3$, $C_4$, and $C_5$, and the charging voltages $-4E_{01}$, $-4E_{01}$, $-4E_{02}$, and $-4E_{02}$ of capacitors $C_9$, $C_8$, $C_7$, and $C_6$, is charged into capacitor $C_{10}$, in which the polarity of output terminal $P_1$ is positive.

Namely, in the loadless condition, each charging voltage of output capacitors $C_6$ and $C_7$ of the second multiple step-up rectifier circuit is $4E_{02}$, which is twice as high as the voltage $2E_{02}$ between $a_2$ and $b_2$. Each of the charging voltages of output capacitors $C_8$, $C_9$, and $C_{10}$ of the first multiple step-up rectifier circuit is $4E_{01}$, which is twice as high as the voltage $2E_{01}$ between $a_1$ and $b_1$. Therefore, assuming that the voltage $2E_{01}$ is generated between second output terminal $P_2$ and reference potential terminal m is $E_2$ [V], $E_2$ is equal to $8E_{02}$. Assume that the voltage which is generated between first and second output terminals $P_1$ and $P_2$ is $E_1$ [V], $E_1$ is equal to $12E_{01}$. Therefore, when it is assumed that the number of steps of the first multiple step-up rectifier circuit (namely, the number of supply capacitors which are connected between either one of first input terminals $a_1$ and $b_1$ and each node among the diodes which are connected in series between $P_1$ and $P_2$) is $n_1$ ($n_1=3$ in the case of FIG. 1), and the number of steps of the second multiple step-up rectifier circuit (namely, the number of supply capacitors which are connected between either one of second input terminals $a_2$ and $b_2$ and each node among the diodes which are connected in series between m and $P_2$) is $n_2$ ($n_2=2$ in the case of FIG. 1), output currents $i_1$ and $i_2$ of output terminals $P_1$ and $P_2$ are 0 in the loadless condition. Therefore, output voltages $E_1$ and $E_2$ of the first and second multiple step-up rectifier circuits in the loadless condition can be obtained by the following expressions, respectively.

$$E_1 = 2n_1 \cdot 2E_{01} \tag{1}$$

$$E_2 = 2n_2 \cdot 2E_{02} \tag{2}$$

The operation under the condition such that a load is connected will now be described. As mentioned above, voltage drops occur in the output voltages by the load current under the condition with a load. This voltage drop will be described with reference to FIG. 2.

A circuit (shown in FIG. 2) is constituted in a manner such that diodes $D_1$ to $D_6$ and capacitors $C_1$, $C_2$, $C_6$, $C_7$, $C_{11}$, and $C_{12}$, which constitute the first multiple step-up rectifier circuit, are removed from the circuit (shown in FIG. 1), the cathode of diode $D_7$, constituting the first rectifier circuit, is connected to reference potential terminal m, and a load resistor $R_L$ is connected between output terminal $P_1$ and reference potential terminal m. In FIG. 2, the same parts and elements as those shown in FIG. 1 are designated by the same reference numerals.

First, if it is assumed that the mean value of the load current for one period is I [A], all of the voltage drops which will be caused in capacitors $C_8$ to $C_{10}$ for one period T are equal to $e_0$. In this case, the following conditions (a) to (c) are satisfied.

(a) The load current is supplied from output capacitors $C_8$, $C_9$, and $C_{10}$. Thus, identical voltage drops $e_0$ occur in these capacitors.

(b) The respective voltage drops which are caused in output capacitors $C_8$, $C_9$, and $C_{10}$ within one period T are compensated by supply capacitors $C_3$, $C_4$, and $C_5$ when the potential of terminal $a_1$ becomes positive. Namely, the voltages discharged by output capacitors $C_8$, $C_9$, and $C_{10}$ are supplemented by the currents from supply capacitors $C_3$, $C_4$, and $C_5$, respectively.

(c) Similarly to item (b), the voltage drops which are caused in supply capacitors $C_3$, $C_4$, and $C_5$ within one period T are respectively compensated by supply capacitors $C_{13}$, $C_{14}$, and $C_{15}$ when the voltage of terminal $b_1$ becomes positive.

Consequently, the voltage drops which are caused in the respective capacitors within one period T are as follows.

$C_8$, $C_9$, $C_{10}$: $e_0$ $C_5$: $e_0$ (Voltage drop due to the supply of the current to capacitor $C_{10}$)

$C_{15}$: $e_0$ (Voltage drop due to the supply of the current to capacitor $C_5$)

$C_4$: $2e_0$ (Voltage drop due to the supply of the currents to capacitors $C_9$ and $C_{15}$)

$C_{14}$: $2e_0$ (Voltage drop due to the supply of the current to capacitor $C_4$)

$C_3$: $3e_0$ (Voltage drop due to the supply of the currents to capacitors $C_8$ and $C_{14}$)

$C_{13}$: $3e_0$ (Voltage drop due to the supply of the current to capacitor $C_3$)

Since the voltage drops which are caused in the respective capacitors are sequentially accumulated by the supply of the currents, they will become as follows:

$C_{13}$:$3e_0$, $C_3$:$6e_0$, $C_{14}$:$8e_0$,
$C_4$:$10e_0$, $C_{15}$:$11e_0$, $C_5$:$12e_0$

Since the voltage drop which is caused in output capacitor $C_{10}$ is supplied by supply capacitor $C_5$, the voltage drop after the current was supplied becomes $12e_0$. Similarly, the voltage drops which are caused in output capacitors $C_9$ and $C_8$ are $10e_0$ and $6e_0$, respectively.

Therefore, the values of the voltage drops in output capacitors $C_8$, $C_9$, and $C_{10}$ can be expressed as follows, respectively:

$C_8$: $(2 \times 3)e_0$
$C_9$: $(2 \times 3 + 2 \times 2)e_0$
$C_{10}$: $(2 \times 3 + 2 \times 2 + 2 \times 1)e_0$ In the above expressions, 3 indicates the number of supply capacitors $C_3$, $C_4$, and $C_5$ or $C_{13}$, $C_{14}$, and $C_{15}$ connected between either one of first input terminals $a_1$ and $b_1$ and each node among the diodes. Therefore, when the number of supply capacitors connected between terminal $a_1$ or $b_1$ and each node among the diodes is represented by n, the voltage drops which are caused in the output capacitors $C_8$, $C_9$, and $C_{10}$ are expressed by the following expressions:

$C_8$: $2ne_0$                                (a)

$C_9$: $\{2n+2(n-1)\}e_0$           (b)

$C_{10}$: $\{2n+2(n-1)+2(n-2)\}e_0$   (c)

Assuming that the whole voltage drop which is caused by the load current is $E_d$, whole voltage drop $E_d$ is the sum of the voltage drops which are caused in output capacitors $C_8$, $C_9$, and $C_{10}$; therefore, it can be expressed as follows:

$$E_d = \{2n \times 3 + 2(n-1)(3-1) + 2(n-2)(3-2)\}e_0$$

In this expression, 3 denotes the number of output capacitors. When the number of output capacitors is also represented by n, whole voltage drop $E_d$ is expressed as follows:

$$E_d = \{2n^2 + 2(n-1)^2 + 2(n-2)^2 + 2(n-3)^2 + \ldots\}e_0 \quad (3)$$

$$= (2\Sigma n^2)e_0$$

$$= \left(\frac{2}{3}n^3 + n^2 + \frac{1}{3}n\right)e_0$$

It is now assumed that the capacitance of each capacitor is C [F], the charge amount is Q [C], the load current is I [A], the period of the input voltage is T [sec], and the frequency is f [Hz]. In this case, $e_0$ is expressed as follows:

$$e_0 = \frac{Q}{C} = \frac{IT}{C} = \frac{I}{C \cdot f}$$

Therefore, expression (3) can be rewritten as follows:

$$E_d = \left(\frac{2}{3}n^3 + n^2 + \frac{1}{3}n\right) \cdot \frac{I}{C \cdot f} \quad (4)$$

On the basis of the above description, it is now assumed that, in the circuit shown in FIG. 1, load currents $i_1$ and $i_2$ are respectively output from first and second output terminals $P_1$ and $P_2$. The voltage drops by load currents $i_1$ and $i_2$ will now be considered. First, voltage drop $E_{1d}$ in output voltage $E_1$ is expressed as follows from expression (4):

$$E_{1d} = \left(\frac{2}{3}n_1^3 + n_1^2 + \frac{2}{3}n_1\right) \cdot \frac{I_1}{C_a \cdot f} \quad (5)$$

where $n_1$ is the number of steps between $P_1$ and $P_2$ and $I_1$ equals $i_1$. Voltage drop $E_{2d}$ in output voltage $E_2$ is expressed as follows from expression (4), since the voltage drop by load current $i_1$ which is output from terminal $P_1$ is added to the voltage drop by load current $i_2$, which is output from terminal $P_2$:

$$E_{2d} = \left(\frac{2}{3}n_2^3 + n_2^2 + \frac{1}{3}n_2\right) \cdot \frac{I_2}{C_b \cdot f} \quad (6)$$

where $n_2$ is the number of steps between $P_2$ and m and $I_2 = i_1 + i_2$.

In the loadless condition, since output voltages $E_1$ and $E_2$ are indicated by expressions (1) and (2), output voltages $E_1$ and $E_2$, when a load is connected, can be expressed as follows:

$$E_1 = 4n_1 E_{01} - \left(\frac{2}{3}n_1^3 + n_1^2 + \frac{1}{3}n_1\right) \cdot \frac{I_1}{C_a \cdot f} \quad (7)$$

$$E_2 = 4n_2 E_{02} - \left(\frac{2}{3}n_2^3 + n_2^2 + \frac{1}{3}n_2\right) \cdot \frac{I_2}{C_b \cdot f} \quad (8)$$

On the basis of the above-mentioned relations, control means for making the output voltages constant, irrespective of the loadless condition, and the condition in which a load is connected will now be described herein below.

First, assuming that by increasing the output voltage value of AC power source A, voltage $2E_{01}$ between $a_1$ and $b_1$ was adjusted to $2E_{01}$, so as to compensate the voltage drop in output voltage $E_1$, the following relation can be derived from expressions (1) and (7):

$$4n_1 E_{01} = 4n_1 E_{01}' - \left(\frac{2}{3}n_1^3 + n_1^2 + \frac{1}{3}n_1\right) \cdot \frac{I_1}{C_a \cdot f} \quad (9)$$

In this case, voltage $2E_{02}$ between $a_2$ and $b_2$ also increases. Therefore, when it is assumed that the increased voltage is $2E_{02}'$ and output voltage $E_2$ is also equalized to the voltage under the loadless condition, the following relation will be obtained from expressions (2) and (8):

$$4n_2E_{02} = 4n_2E_{02}' - \left(\frac{2}{3}n_2^3 + n_2^2 + \frac{1}{3}n_2\right) \cdot \frac{I_2}{C_b \cdot f} \quad (10)$$

The following expressions are derived by dividing both sides in expressions (9) and (10) by $4n_1E_{01}$ and $4n_2E_{02}$, respectively:

$$1 = \frac{E_{01}'}{E_{01}} - \frac{1}{4n_1E_{01}} \cdot \left(\frac{2}{3}n_1^3 + n_1^2 + \frac{1}{3}n_1\right) \cdot \frac{I_1}{C_a \cdot d} \quad (11)$$

$$1 = \frac{E_{02}'}{E_{02}} - \frac{1}{4n_2E_{02}} \cdot \left(\frac{2}{3}n_2^3 + n_2^2 + \frac{1}{3}n_2\right) \cdot \frac{I_2}{C_a \cdot d} \quad (12)$$

When the voltage on the primary side of transformer T increases, the voltage between $a_1$ and $b_1$ and the voltage between $a_2$ and $b_2$ on the secondary side also increases at the same ratio. Therefore, the following relation is obtained:

$$\frac{E_{01}'}{E_{01}} = \frac{E_{01}'}{E_{02}} \quad (13)$$

Thus, the following expression can be derived from expressions (11) and (12):

$$\frac{C_a}{C_b} = \frac{\frac{2}{3}n_1^2 + n_1 + \frac{1}{3}}{\frac{2}{3}n_2^2 + n_2 + \frac{1}{3}} \times \frac{I_1}{I_2} \times \frac{E_{02}}{E_{01}} \quad (14)$$

Therefore, in the circuit shown in FIG. 1, if the ratio of the capacitances of the capacitors is set so as to satisfy expression (14), and one output voltage (for example: $E_2$) is regulated, the other output voltage (for example: $E_1$) can be also simultaneously regulated. This regulating means may be realized by, for instance, detecting the level of output voltage $E_2$ and by controlling the output value of AC power source A so that this detection level always coincides with the reference voltage level.

Figure 3:
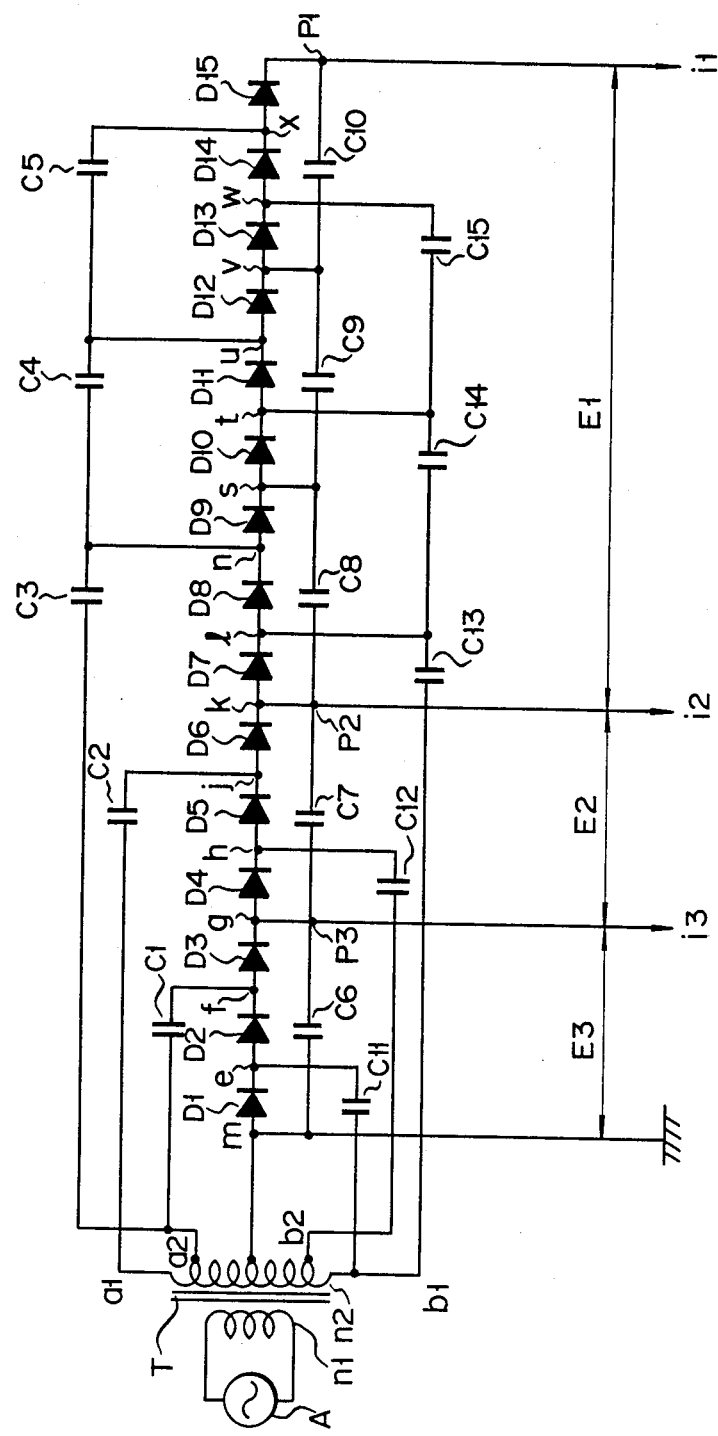
FIG. 3 is a circuit arrangement diagram showing the second embodiment of a multiple step-up rectifier circuit according to the invention.

FIG. 3 shows the second embodiment, in which the same parts and elements as those shown in the circuit of FIG. 1 are designated by the same reference numerals.

Namely, in a multiple step-up rectifier circuit shown in FIG. 3, capacitor $C_1$ is connected between $a_2$ and f; capacitor $C_2$ is connected between $a_1$ and j; capacitor $C_{11}$ is connected between $b_1$ and e; capacitor $C_{12}$ is connected between $b_2$ and h; and capacitor $C_3$ is connected between $a_2$ and n. Node g between diodes $D_3$ and $D_4$ is a third output terminal $P_3$. The other circuit constitution is the same as that in FIG. 1. Namely, diodes $D_7$ to $D_{15}$ and capacitors $C_3$ to $C_5$, $C_8$ to $C_{10}$, and $C_{13}$ to $C_{15}$ constitute the first multiple step-up rectifier circuit; diodes $D_4$ to $D_6$ and capacitors $C_2$, $C_7$, and $C_{12}$ constitute the second multiple step-up rectifier circuit; and diodes $D_1$ to $D_3$ and capacitors $C_1$, $C_6$, and $C_{11}$ constitute the third multiple step-up rectifier circuit. It is now assumed that all of the capacitances of capacitors $C_3$ to $C_5$, $C_8$ to $C_{10}$, and $C_{13}$ to $C_{15}$ of the first multiple step-up rectifier circuit are equal to $C_a$ [F]. It is assumed that all of the capacitances of capacitors $C_2$, $C_7$, and $C_{12}$ of the second multiple step-up rectifier circuit are equal to $C_b$ [F]. It is assumed that all of the capacitances of capacitors $C_1$, $C_6$, and $C_{11}$ of the third multiple step-up rectifier circuit are equal to $C_c$ [F].

In the above constitution, it is now assumed that the voltage of $2E_{01}$ is generated between first input terminals $a_1$ and $b_1$ and the voltage of $2E_{02}$ is generated between second input terminals $a_2$ and $b_2$. In this case, the following voltages are charged into the capacitors, respectively:

$C_{11}:E_{01}$, $C_1:2E_{01}+E_{02}$, $C_6:2(E_{01}+E_{02})$,
$C_{12}:2E_{01}+3E_{02}$, $C_2:3E_{01}+4E_{02}$, $C_7:2(E_{01}+E_{02})$,
$C_{13}:5E_{01}+4E_{02}$, $C_3:6E_{01}+5E_{02}$, $C_8:2(E_{01}+E_{02})$,
$C_{14}:2(E_{01}+E_{02})$, $C_4:2(E_{01}+E_{02})$, $C_9:2(E_{01}+E_{02})$,
$C_{15}:2(E_{01}+E_{02})$, $C_5:2(E_{01}+E_{02})$, $C_{10}:2(E_{01}+E_{02})$

From the above description, output voltages $E_1$ to $E_3$ of the first to third multiple step-up rectifier circuits under the loadless condition can be expressed as follows when the numbers of steps of these circuits assume $n_1$, $n_2$, and $n_3$, respectively:

$$E_1 = 2n_1(E_{01}+E_{02}) \quad (15)$$

$$E_2 = 2n_2(E_{01}+E_{02}) \quad (16)$$

$$E_3 = 2n_3(E_{01}+E_{02}) \quad (17)$$

Voltage drops $E_{1d}$, $E_{2d}$, and $E_{3d}$ of the first to third multiple step-up rectifier circuits can be expressed as follows from expression (4):

$$E_{1d} = \left(\frac{2}{3}n_1^3 + n_1^2 + \frac{1}{3}n_1\right) \cdot \frac{I_1}{C_a \cdot f} \quad (18)$$

$$E_{2d} = \left(\frac{2}{3}n_2^3 + n_2^2 + \frac{1}{3}n_2\right) \cdot \frac{I_2}{C_b \cdot f} \quad (19)$$

$$E_{3d} = \left(\frac{2}{3}n_3^3 + n_3^2 + \frac{1}{3}n_3\right) \cdot \frac{I_3}{C_c \cdot f} \quad (20)$$

In this case, it is assumed that the load currents which are output from first to third output terminals $P_1$ to $P_3$ are $i_1$, $i_2$, and $i_3$, respectively, and that $I_1=i_1$, $I_2=i_1+i_2$, and $I_3=i_1+i_2+i_3$. Therefore, output voltages $E_1$, $E_2$, and $E_3$, when a load is connected, are expressed as follows, respectively:

$$E_1 = 2n_1(E_{01}+E_{02}) - \left(\frac{2}{3}n_1^3 + n_1^2 + \frac{1}{3}n_1\right) \cdot \frac{I_1}{C_a \cdot f} \quad (21)$$

$$E_2 = 2n_2(E_{01}+E_{02}) - \left(\frac{2}{3}n_2^3 + n_2^2 + \frac{1}{3}n_2\right) \cdot \frac{I_2}{C_b \cdot f} \quad (22)$$

$$E_3 = 2n_3(E_{01}+E_{02}) - \left(\frac{2}{3}n_3^3 + n_3^2 + \frac{1}{3}n_3\right) \cdot \frac{I_3}{C_c \cdot f} \quad (23)$$

The output voltage of power source A is adjusted so that output voltage $E_3$ under the loadless condition is equal to output voltage $E_3$ when a load is connected. When it is now assumed that the voltage between $a_2$ and $b_1$ is $(E_{02}+E_{01})'$, the following relation is obtained from expressions (17) and (23):

$$2n_3(E_{01}+E_{02}) = \quad (24)$$

-continued $$2n_3(E_{01} + E_{02})' - \left(\frac{2}{3} n_3^3 + n_3^2 + \frac{1}{3} n_3\right) \cdot \frac{I_3}{C_c \cdot f}$$

At this time, the voltage between $a_1$ and $b_2$ also increases at the same ratio as the change in voltage between $a_2$ and $b_1$. When this increased voltage assumes $(E_{01}+E_{02})''$, the following relations are derived from expressions (16), (22), (15), and (21):

$$2n_2(E_{01} + E_{02}) = \quad (25)$$

$$2n_2(E_{01} + E_{02})'' - \left(\frac{2}{3} n_2^3 + n_2^2 + \frac{1}{3} n_2\right) \cdot \frac{I_2}{C_b \cdot f}$$

$$2n_1(E_{01} + E_{02}) = \quad (26)$$

$$2n_1(0_1 + E_{02})'' - \left(\frac{2}{3} n_1^3 + n_1^2 + \frac{1}{3} n_1\right) \cdot \frac{I_1}{C_a \cdot f}$$

In this case, since $$\frac{(E_{01} + E_{02})'}{E_{01} + E_{02}} = \frac{(E_{01} + E_{02})''}{E_{01} + E_{02}} \quad (27)$$

the following expressions can be derived from expression (24) to (27):

$$\frac{C_a}{C_b} = \frac{\frac{2}{3} n_1^2 + n_1 + \frac{1}{3}}{\frac{2}{3} n_2^2 + n_2 + \frac{1}{3}} \times \frac{I_1}{I_2} \quad (28)$$

$$\frac{C_b}{C_c} = \frac{\frac{1}{3} n_2^2 + n_2^2 + \frac{1}{3}}{\frac{2}{3} n_3^2 + n_3 + \frac{1}{3}} \times \frac{I_2}{I_3} \quad (29)$$

$$\frac{C_a}{C_b} = \frac{\frac{1}{3} n_1^2 + n_1 + \frac{1}{3}}{\frac{2}{3} n_3^2 + n_3 + \frac{1}{3}} \times \frac{I_1}{I_3} \quad (30)$$

Therefore, if the ratios among the capacitances of the respective capacitors are set so as to satisfy expressions (28) to (30), by regulating one output voltage (for example: $E_3$), all of the output voltages (e.g., $E_1$ and $E_2$) can be also regulated.

The present invention is not limited to the above embodiments. For example, in the first and second embodiments, the description has been made with respect to the case of using the secondary winding of the transformer having the first and second input terminals receive the AC voltage and the center tap terminal as the reference potential terminal. However, the invention can be also realized by the constitution such that the first and second input terminals and reference input terminal are directly connected to the AC power source without passing through the transformer. On the other hand, the description has been made with regard to the operation in the above embodiments in the case where the voltage between the second input terminal and the reference potential terminal differs from the voltage of the corresponding first input terminal. However, even if they are the same voltage, no contradiction will be caused in the operation. The essential point is to determine the capacitances of the capacitors constituting each multiple step-up rectifier circuit so as to satisfy expression (14) in accordance with the magnitude of load current and with the number of multiple steps.

What is claimed is:

1. A multiple step-up rectifier circuit, comprising:
first input terminals (A1, B1) between which a first voltage is applied;
second input terminals (A2, B2) between which a second voltage different from said first voltage is applied;
a reference potential point provided between said first input terminals and between said second input terminals, the polarity of said first voltage applied to one (A1) of said first input terminals being opposite to that of said first voltage applied to the other first input terminal (B1) with respect to said reference potential point, and the polarity of said second voltage applied to one (A2) of said second input terminals being opposite to that of said second voltage applied to the other second input terminal (B2) with respect to said reference potential point;
a plurality of rectifier elements connected in series to provide a rectifier series circuit and have the same rectifying direction, one end of said rectifier series circuit being connected to said reference potential point;
a plurality of first capacitors connected in series to provide a capacitor series circuit having two ends connected to the respective ends of said rectifier series circuit, each first capacitor being connected in parallel to two or more of said first rectifier elements;
a first output terminal provided at that end of said capacitor series circuit which is connected to the other end of said rectifier series circuit;
a second output terminal provided at a connection point between arbitrary, adjacent two of said first capacitors;
second capacitors grouped into first and second second capacitor groups, said first second capacitor group including at least one of said second capacitors, and having two ends, one of which is connected to said one (A1) of said first input terminals while the other end of said first second capacitor group is connected to a connection point between arbitrary, adjacent two of said rectifier elements, which is located between said first and second output terminals, said second second capacitor group including at least one of said second capacitors, and having two ends, one of which is connected to said other first input terminal (B1) while the other end of said second second capacitor group is connected to a connection point between arbitrary, adjacent two of said rectifier elements, which is located between said first and second output terminals and is different from said connection point where said other end of said first second capacitor group is connected;
third capacitors grouped into first and second third capacitor groups, said first third capacitor group including at least one of said third capacitors, and having two ends, one of which is connected to said one (A2) of said second input terminals while the other end of said first third capacitor group is connected to a connection point between arbitrary, adjacent two of said rectifier elements, which is located between said second output terminal and said reference potential point or connected to a connection point between arbitrary, adjacent two of said rectifier elements, which is located between said second output terminal and a third output terminal located closer to said reference potential point than said second output terminal, said second third capacitor group including at least one of said third capacitors, and having two ends, one of which is connected to said other second input terminal (B2) while the other end of said second third capacitor group is connected to a connection point between arbitrary, adjacent two of said rectifier elements, which is located between said second output terminal and said reference potential point or a connection point between arbitrary, adjacent two of said rectifier elements, which is different from said connection point where said other end of said first third capacitor group is connected;

said second and third capacitors having the following relationship:

$$\frac{C_1}{C_2} = \frac{\frac{4}{3}n_1^2 + n_1 + \frac{1}{3}}{\frac{4}{3}n_2^2 + n_2 + \frac{1}{3}} \times \frac{I_1}{I_2} \times \frac{E_2}{E_1}$$

where
$C_1$: capacitance of each of said second capacitors,
$C_2$: capacitance of each of said third capacitors,
$n_1$: half the number of said second capacitors,
$n_2$: half the number of said third capacitors,
$I_1$: output current of said first output terminal,
$I_2$: output current of said second output terminal,
$E_1$: first voltage applied between said first input terminals, and
$E_2$: second voltage applied between said second input terminals.

2. A multiple step-up rectifier circuit according to claim 1, wherein each of said first and second second capacitor groups includes a plurality of second capacitors connected in series and a connection point between adjacent second capacitors in each of said first and second second capacitor groups is connected to a connection point between arbitrary, adjacent two of said rectifier elements, which is located between said first and second output terminals.

3. A multiple step-up rectifier circuit according to claim 1, wherein each of said first and second third capacitor groups includes a plurality of third capacitors connected in series and a connection point between adjacent third capacitors in each of said first and second third capacitor groups is connected to a connection point between arbitrary, adjacent two of said rectifier elements, which is located between said second output terminal and said reference potential point or a connection point between arbitrary, adjacent two of said rectifier elements, which is located between said second output terminal and said third output terminal.

4. A multiple step-up rectifier circuit according to claim 1, wherein said first voltage applied to said one (A1) of said first input terminals has the same amplitude as said first voltage applied to said other first input terminal (B1) with respect to said reference potential point.

5. A multiple step-up rectifier circuit according to claim 1, wherein said second voltage applied to said one (A2) of said second input terminals has the same amplitude as said second voltage applied to said other second input terminal (B2) with respect to said reference potential point.

6. A multiple step-up rectifier circuit according to claim 1, wherein each of said first and second second capacitor groups includes a plurality of second capacitors connected in series, each of said first and second third capacitor groups includes a plurality of third capacitors connected in series, a connection point between adjacent second capacitors in each of said first and second second capacitor groups is connected to a connection point between arbitrary, adjacent two of said rectifier elements, which is located between said first and second output terminals, and a connection point between adjacent third capacitors in each of said first and second third capacitor groups is connected to a connection point between arbitrary, adjacent two of said rectifier elements, which is located between said second output terminal and said reference potential point or a connection point between arbitrary, adjacent two of said rectifier elements, which is located between said second output terminal and said third output terminal.

7. A multiple step-up rectifier circuit according to claim 1, wherein said first and second input terminals are provided on the secondary winding of a transformer, said secondary winding having a center tap grounded and connected to said reference potential point.

8. A multiple step-up rectifier circuit according to claim 7, wherein said one (A1) of said first input terminals and said one (A2) of said second input terminals are provided on said secondary winding of said transformer at the same potential point.

9. A multiple step-up rectifier circuit according to claim 7, wherein said other first input terminal (B1) and said other second input terminal (B2) are provided on said secondary winding of said transformer at the same potential point.

* * * * *